(12) United States Patent
Hinton

(10) Patent No.: US 10,939,617 B2
(45) Date of Patent: Mar. 9, 2021

(54) EXTRACTOR DEVICE FOR CROP PRODUCTION SYSTEMS

(71) Applicant: Theodore B. Hinton, Hiawatha, KS (US)

(72) Inventor: Theodore B. Hinton, Hiawatha, KS (US)

(73) Assignee: Theodore B Hinton, Hiawatha, KS (US)

( * ) Notice: Subject to any disclaimer, the term of this patent is extended or adjusted under 35 U.S.C. 154(b) by 84 days.

(21) Appl. No.: 15/966,559

(22) Filed: Apr. 30, 2018

(65) Prior Publication Data

US 2019/0261558 A1     Aug. 29, 2019

Related U.S. Application Data

(60) Provisional application No. 62/636,316, filed on Feb. 28, 2018.

(51) Int. Cl.
*A01D 34/835* (2006.01)
*A01D 25/04* (2006.01)
*A01D 65/00* (2006.01)

(52) U.S. Cl.
CPC ........ *A01D 34/8355* (2013.01); *A01D 25/044* (2013.01); *A01D 65/00* (2013.01)

(58) Field of Classification Search
CPC ... A01D 34/8355; A01D 25/044; A01D 65/00
USPC .................................. 171/50, 53, 59, 61, 62
See application file for complete search history.

(56) References Cited

U.S. PATENT DOCUMENTS

| | | | | |
|---|---|---|---|---|
| 386,190 A * | 7/1888 | Ferrel | ................ | A01D 34/8355 56/504 |
| 1,757,873 A * | 5/1930 | O'Kelley | ........... | A01D 34/8355 172/421 |
| 3,167,132 A * | 1/1965 | Bucher | ................... | A01D 33/02 171/27 |
| 4,919,211 A * | 4/1990 | Cope | ...................... | A01B 27/00 172/520 |
| 9,192,098 B2 | 11/2015 | Hinton | | |

OTHER PUBLICATIONS

Orthman Manufacturing, Inc., "Stalk Puller" [retrieved on Apr. 27, 2018] <URL:http://www.orthman.com/our-products.aspx?itemid=2051&prodid=10884&pagetitle=Stalk+Puller.

* cited by examiner

*Primary Examiner* — Tara Mayo-Pinnock
(74) *Attorney, Agent, or Firm* — Zarley Law Firm, P.L.C.

(57) ABSTRACT

The present invention relates to a no-till stem and root extractor system that has directionality, extracting the root ball from the soil. A conveyor chain crop remnant extractor assembly has a pair of flexible conveyor chains, a pair of coupling conveyor arms, two pairs of rotatable wheels, a pinch cylinder, and a plurality of cross-slat bars. As the device moves along the crop remnants, the pair of flexible conveyor chains, guided and retained by the two pairs of rotatable wheels, pull the stalks and root balls from the earth, pinch, and pulverize the complete crop remnants.

20 Claims, 3 Drawing Sheets

EXTRACTOR DEVICE FOR CROP PRODUCTION SYSTEMS

RELATED APPLICATIONS

This application claims the benefit of U.S. Provisional Patent Application No. 62/636,316 filed Feb. 28, 2018, the entire contents of which are incorporated herein by reference.

FIELD OF THE INVENTION

The present disclosure generally relates to agricultural devices and, more particularly, to agricultural devices for removing crop remnants from soil.

BACKGROUND OF THE INVENTION

This invention is directed toward a crop stem and root extractor device for use in no-till crop production systems. More specifically, and without limitation, this invention relates to an agricultural system that includes a device that mechanically removes crop remnant stems and root balls positioned behind or within a conventional corn header system with no additional mechanical, hydraulic, or electrical energy supplied to the device other than the forward motion provided by an agricultural vehicle.

Conventional corn header assemblies and crop remnant processors are well known in the art. However, many are not suitable for no-till farming which requires zero tillage, i.e. physical digging or disturbance, of the crop soil which enhances infiltration of rain and irrigation water, direct soil irrigation, increases organic matter retention and cycling of nutrients in the soil. This type of farming has also been shown to reduce soil erosion in some regions, increase the amount and variety of life in and on the soil, and provides an improvement in soil biological fertility—making the crop soil more resilient. As such, no-till farming has become more popular.

A disadvantage of this type of farming, however, is that crop remnants remain and may accumulate on the topsoil which reduces rates of planting, plant emergence, and can cause significant damage to agricultural vehicle tires and mechanical attachments, increasing the overall expenditure of any given harvest or planting season. For example, the average life-span of an agricultural vehicle tire is 5 or 6 years when not exposed to crop remnant stalks. In some cases, however, remnant stalks have been shown to reduce the life span of the tires by at least half.

Plant stalks and root balls are known to be made of recalcitrant tissue that does not easily decompose due to common modern practices of hybridization and selective breeding that aim to create stronger and more structurally sound plant varieties. These plants are comprised of a higher concentration of lignins and silicates which results in a more robust structure but simultaneously results in much slower plant decomposition due to a concurrent higher percentage of cellulose within the plants. These slowly decomposing plants lead to many deleterious effects in no-till crop production. As noted above, these crop remnants pit and scour the tires of farm machinery as it operates in the field. This machinery includes agricultural planting, and harvesting implements, and any type of truck or vehicle that may need to access the crop plot. Additionally, these remaining crop remnants interfere with the seeding of the next planting season because these remnants retain nutrients in a form that is therefore not available to seeds and seedlings until the remnant has reached a particular level of decomposition, which leads to nutrient deficiencies and increased applications of fertilizer to compensate for the nutrients bound in the remnant residue and not delivered to the seeds or seedlings, and therefore leads to a loss of productivity and an increase in farming costs. Also, when planting crops into remnant crop stalks, the remnant stalks can create air pockets in the seed trench which may cause shallow or inconsistent depth of seed and seedling placement—reducing overall crop yield. These remnants become lodged between the seed and the soil, creating the air pockets in the seed trench thereby interfering with establishment of seed to soil contact. Each of these operational impediments result in reduced farming productivity and an increase in farming costs.

Currently, most solutions have been focused on the use of tillage to mitigate these deleterious conditions. As noted above, tillage farming has many drawbacks while no-till farming provides many lucrative advantages over tillage processes. Additionally, there are agricultural implements that extract plan stems through mechanical means. One system, the Orthman Stalk Puller, is known in the art. This design, however, has its deficiencies. For example, the Orthman Stalk Puller requires additional tractive energy to operate and pulls and throws significant plume of crop soil along with the crop remnant root that it is not considered a no-till farming option, but rather a strip-till farming option. This device also requires a specific orientation over the crop row in order to be effective.

In addition, other commonly used stalk pullers entail the use of additional active, or motorized power provided by a hydraulic motor or power train unit. Many of these systems also require at least a pair of tires that abut each other and are in tandem operation, thus having a pinch point at the union of the tires which draws the stem from the soil. However, these systems must also be directly positioned over the crop row in order to function.

Lastly, many solutions have been presented for no-tillage farming that involve farming implements that flatten or shred the stalk in order to expedite plant decomposition. These implements, however, do not remove or address issues caused by the root ball of the crop remnant.

One solution to this problem is presented in U.S. Pat. No. 9,192,098 (hereinafter '098) to Hinton in which an internal cylinder rotates within an external cylinder as a rear attachment to a farming vehicle. This invention, however, has its deficiencies. To begin, as a rear attachment, the wheels of the driving vehicle are not protected from crop remnant damage. Also, the internal cylinder's position must be fixed in relation to the outside cylinder, meaning, if the internal cylinder were allowed to roll both forward and backward within the external cylinder, the pinching and pulling effect of the system was significantly reduced and inconsistent. Thereby, the '098 patent cannot provide any useful operational directionality with two rigid cylindrical components. Further, the device in '098 is not able to scale to any effective level for use in conjunction with a corn header system, thereby interfering with additional rear attachments such as sprayers. As such, a user of the '098 system would need to take up valuable time and resources to attach the device and then attach a different device for a different purpose. Lastly, the rigid '098 device cannot be configured or molded to fit within either tight crop spaces or within a conventional corn header assembly.

Thus it is a primary objective of this invention to provide a stem and root extractor device for use in no-till crop production system that improves upon the art.

Another objective of this invention is to provide a stem and root extractor device that homogenously processes the entire crop remnant stalk and root ball.

Yet another objective of this invention is to provide a stem and root extractor device that is able to mold into tight clearance areas such as narrow width crop rows and within crop header assemblies.

Another objective of this invention is to provide a stem and root extractor device that is of adjustable height to effectuate use and non-use.

Yet another objective of this invention is to provide a stem and root extractor device that does not require active or motorized power to operate.

Another objective of this invention is to provide a stem and root extractor device that processes crop remnants prior to the operating vehicle main frame or wheels encountering the crop remnants.

Yet another objective of this invention is to provide a stem and root extractor device that pinches, pulls, and pulverizes both crop remnant stalks and root balls.

Another objective of this invention is to provide a stem and root extractor device for use in no-till farming.

These and other objectives, features, and advantages of the invention will become apparent from the specification and claims.

SUMMARY OF THE INVENTION

In general, the present invention relates to a stem and root extractor device for use in no-tillage farming. The device includes a conveyor chain crop remnant extractor assembly that pinches, pulls, and pulverizes both the crop remnant stalk and root ball. This pinching, pulling, and pulverizing is accomplished by a pair of flexible conveyor chains, a pair of coupling conveyor arms, two pairs of rotatable wheels, a pinch cylinder, and a plurality of cross-slat bars. The device is pivotally and adjustably coupled to a back face, bottom face, or combination of both back and bottom face of a conventional corn header assembly or sized such that the device fits within the back portion, a portion opposite the front feeder end of the corn header assembly, of the corn header assembly. The pair of conveyor chains engage, are retained by, and move over the two pairs of rotatable wheels with one set, one conveyor chain for two rotatable wheels, positioned above an end of the pinch cylinder with the remaining conveyor chain and two rotatable wheels positioned above an opposite end of the pinch cylinder. The two pairs of rotatable wheels guide the pair of conveyor chains along an edge of each of the pair of coupling conveyor arms. The pair of flexible conveyor chains also engage and move along opposite ends of the pinch cylinder. The plurality of cross-slat bars are positioned perpendicularly between and connected to the pair of flexible conveyor chains which similarly dictates that the plurality of cross-slat bars are positioned perpendicularly between but not connected to the pair of coupling conveyor arms. The coupling conveyor arms are positioned opposite each other. As the pair of conveyor chains move along the ends of the pinch cylinder, crop remnant stalks and root balls are lifted from the ground, pinched between the cross-slat bars and the pinch cylinder, and pulverized beneath the pinch cylinder as it rolls along the ground. The pair of flexible conveyor chains and the cross-slat bars feed the pulverized complete crop remnant upwardly and away from the pinch cylinder to be discarded on the ground.

DETAILED DESCRIPTION

Figure 1:
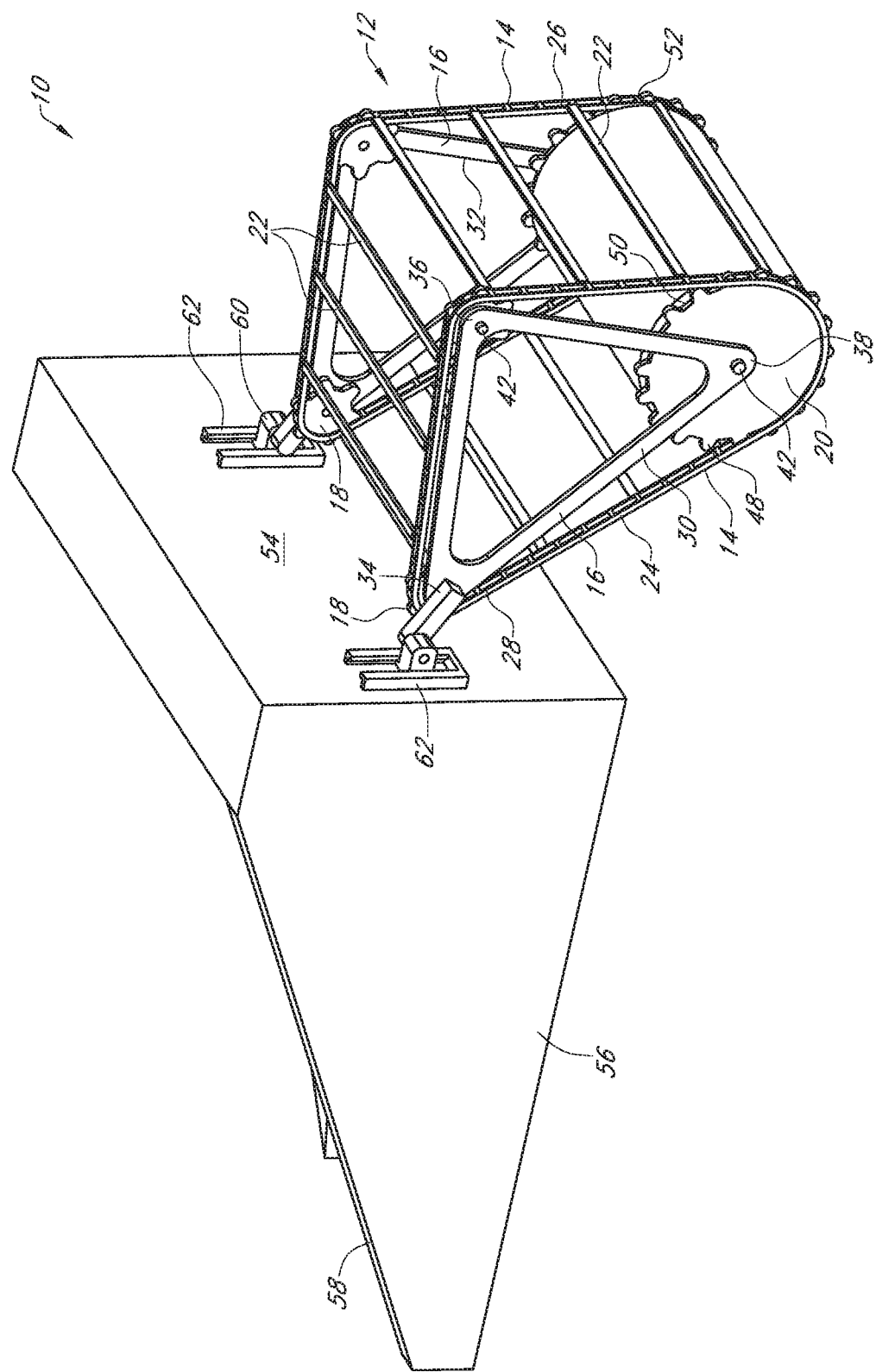
FIG. 1 is a side view of a stem and root extractor device.

With reference to the figures, a stem and root extractor device 10 is shown having a conveyor chain crop remnant extractor assembly 12. The crop remnant extractor assembly 12 includes a pair of flexible conveyor chains 14, a pair of coupling conveyor arms 16, two pairs of rotatable wheels 18, a pinch cylinder 20, and a plurality of cross-slat bars 22.

Figure 2:
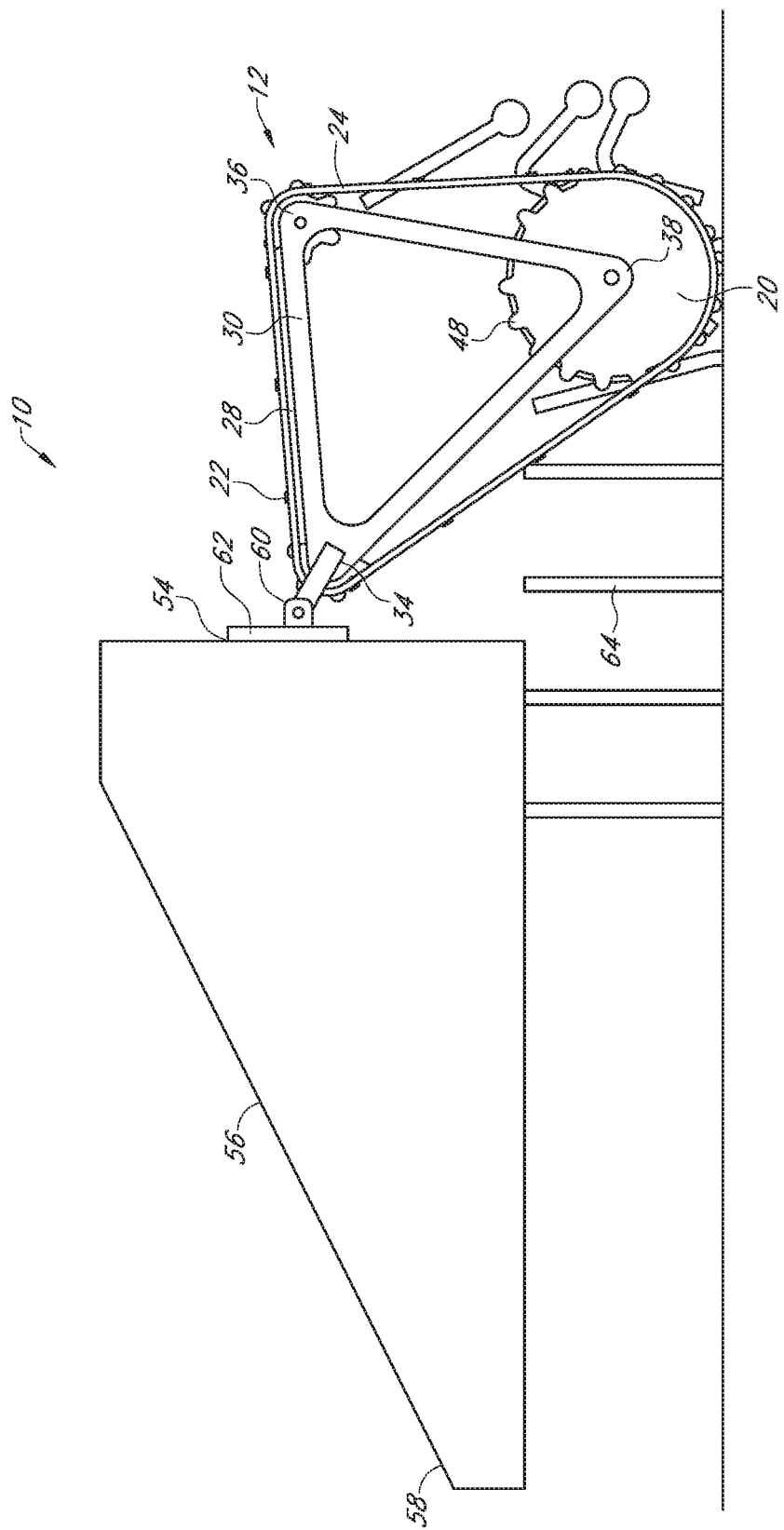
FIG. 2 is a top-side view of a stem and root extractor device.
Figure 3:
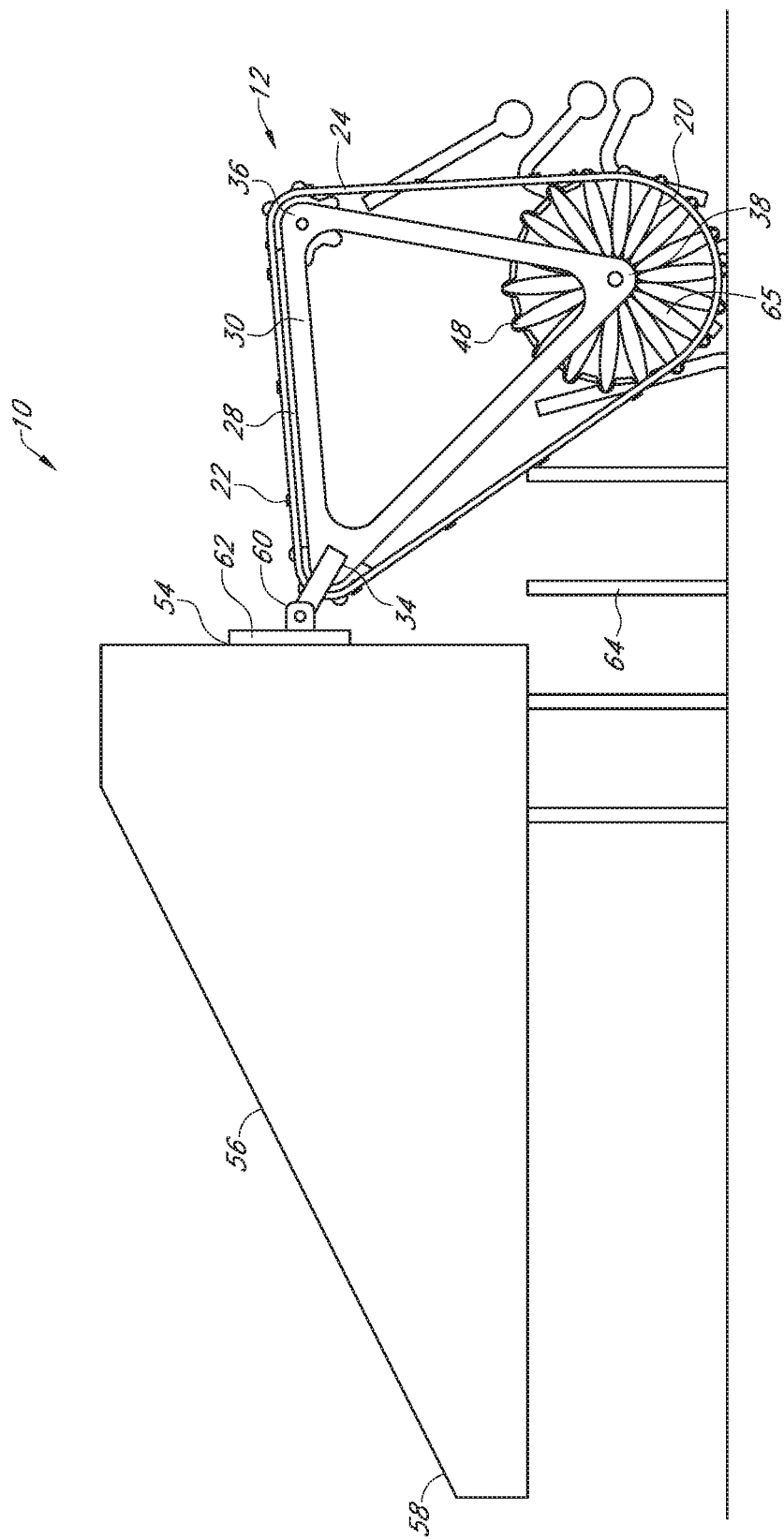
FIG. 3 is a top view of a stem and root extractor device.

The pair of flexible conveyor chains 14 are first and second flexible conveyor chains 24, 26. It is to be understood that the pair of flexible conveyor chains 14 are metal, thermoplastic, hardened polymer, or any other suitable chain material that is capable of rotational movement and threading read upon as a conventional chain configuration. The pair of flexible conveyor chains 14 are positioned and travel when in operation in parallel relation to an outer edge 28 of the pair of coupling conveyor arms 16. The pair of coupling conveyor arms 16 are a first and second coupling conveyor arms 30, 32 which are positioned in parallel relation to each other. The plurality of cross-slat bars 22 are positioned perpendicularly between and connected to the pair of flexible conveyor chains 14. In one embodiment, the plurality of cross-slat bars 22 are also positioned perpendicularly between and not connected to the pair of coupling conveyor arms 16. The plurality of cross-slat bars 22 extend along the width and rotatably engage the pinch cylinder 20 in turn when the device 10 is in motion in order to create a "pinching" effect. The pinch cylinder 20 is a uniform cylinder as shown in FIG. 2 or is comprised of a plurality of rollers 65 that form the pinch cylinder 20 as shown in FIG. 3. The plurality of cross-slat bars 22 may be rigid or flexible depending on preferred embodiment disclosed herein. In addition, the cross-slat bars 22 may be formed of polypropylene, thermoplastic, rubber or the like. In one embodiment the pair of coupling conveyor arms 16 have a first, second, and third end 34, 36, 38 spaced such that the first and second coupling conveyor arms 30, 32 form two triangular shapes that are in parallel relation and opposite each other as shown in FIG. 1. The first and second ends 34, 36 are positioned above and in angled relation to the third end 38 of the pair of coupling conveyor arms 16. The two pairs of rotatable wheels 18 having teeth 40 extending therefrom are divided between the first and second coupling conveyor arms 30, 32 with two rotatable wheels connected to each coupling conveyor arm 30 and 32.

One rotatable wheel of the two pairs of rotatable wheels 18, is rotatably connected to an internal side of the first end 34 of the first coupling conveyor arm 30 while another rotatable wheel of the two pairs of rotatable wheels 18 is rotatably connected to an internal side of the second end 36 of the first coupling conveyor arm 30. Similarly, one rotatable wheel of the two pairs of rotatable wheels 18 is rotatably connected to an internal side of the first end 34 of the second coupling conveyor arm 32 while another rotatable wheel of the two pairs of rotatable wheels 18 is rotatably connected to an internal side of the second end 36 of the second coupling conveyor arm 32. It is understood that the rotatable connection between the two pairs of rotatable wheels 18 and their respective ends 34, 36 of the first and second coupling conveyor arms 30, 32 is achieved by conventional connector members 42 such as screws, bolts, small column threaders, and the like. In one embodiment, an internal side of the third end 38 of the first coupling conveyor arm 30 is rotatably connected to and engages a central point of a first flat end 44 of the pinch cylinder 20 via connection members 42. Similarly, an internal side of the third end 38 of the second coupling conveyor arm 32 is rotatably connected to and engages a central point of a second flat end 46 of the pinch cylinder 20 opposite the first flat end 44 of the pinch cylinder 20 via connection members 42 as shown in FIG. 2. In one embodiment, the pinch cylinder 20 has teeth 48 extending along and around the outer perimeter of the pinch cylinder.

In one embodiment, the first flexible conveyor chain 24 is positioned in parallel relation to and wraps around the first coupling conveyor arm 30 and a first edge 50 of the pinch cylinder 20 while the second flexible conveyor chain 26 is positioned in parallel relation to and wraps around the second coupling conveyor arm 32 and a second edge 52 of the pinch cylinder 20. The first edge 50 of the pinch cylinder 20 is positioned opposite the second edge 52 of the pinch cylinder 20 as shown in FIG. 2. In one embodiment, the pair of flexible conveyor chains 14 engage the two pairs of rotatable wheels 18 such that the teeth 40 of the wheels 18 extend through the chains 14 when the device 10 is moving in order to feed the chain along the assembly 12. The two sets of rotatable wheels 18 guide and retain the pair of flexible conveyor chains 14 along the outside edge 28 of the pair of coupling conveyor arms 30, 32 and along the first and second edges 50, 52 of the pinch cylinder 20.

In one embodiment, an external side of first end 34 of the pair of coupling conveyor arms 16 is connected to a back face 54 of a conventional corn header assembly 56 that is positioned behind in spaced relation to a front crop feeder end 58 of the corn header assembly by a two-piece pivot bracket 60. Positioned on the back face 54 of the corn header assembly 56 is a vertical slide bracket 62. The pivot bracket 60 engages the vertical slide bracket 62 such that assembly 12 can be slid to a higher or lower position along the vertical slide bracket 62 in order to accommodate use, non-use storage, or varying heights of crop remnants.

In operation, forward movement of the agricultural vehicle (not shown) pushes the corn header assembly 56 which then drags the conveyor chain crop remnant extractor assembly 12 along the ground. As such, the device 10 does not require precise alignment with rows of remnant stalks but instead is merely pulled across the crop field and any row of remnant crop stalk 64 positioned within the width of the assembly 12 will be removed from the soil, thereby decreasing the amount of time and effort required by the operator. As the pinch cylinder 20 rotates, the pair of flexible conveyor chains 14 are fed along the pair of coupling conveyor arms 16 by the two pairs of rotatable wheels 18. As the chains 14, cross-slat bars 22, and pinch cylinder 20 rotate and engage a crop remnant stalk 64, the stalk 64 is pinched between the plurality of cross-slat bars 22 and the pinch cylinder 20, retaining the stalks against the pinch cylinder 20. The stalk 64 is pulverized by the rotating pinch cylinder 20 as the device 10 continues moving forward. The teeth of the cross-slat bars 22 assist in gripping, puncturing, and tearing the crop stalk 64. Alternatively, the teeth of the pinch cylinder 20 assist in gripping, puncturing, and tearing the crop stalk 64. Either or both the cross-slat bars 22 or pinch cylinder 20 have teeth projecting therefrom. Pinching, puncturing, and rolling accelerates decomposition of the stalk 64. The stalk 64 is then pulled toward the rear of the assembly 12 by the pair of flexible conveyor chains 14 and the cross-slat bars 22 beyond the planted position of the stalk 64 which results in a natural lifting and pulling motion as the pinch cylinder 20 rotates over and beyond the planted position of the stalk 64 and the chains 14 continue to rotate and the cross-slat bars 22 continue to retain the stalk 64 against the pinch cylinder 20. The pair of flexible conveyor chains 14 and the cross-slat bars 22 continue to pull the stalk 64 up from the earth such that the root ball 66 of the crop remnant is removed from the ground and fed into the assembly 12. This pulling and lifting motion provides for minimal soil disruption. The ground-freed stalk 64 and root ball 66 are then fed upwardly and away from the pinch cylinder 20 until the stalk 64 and root ball 66 are no longer pinched between cross-slat bars 22 and the pinch cylinder 20. The pulverized stalk 64 and root ball 66 is released by the assembly 12 and falls to the ground.

Alternatively, the stem and root extractor device 10 is sized such that the entire conveyor chain crop remnant extractor assembly 12 fits within an open-ended cavity of the corn header assembly 56 such that no interference between the device 10 and the assembly 56 exists. It is understood that sufficient clearance between the device 10 and any walls of the corn header assembly 56 must be optimized for proper crop remnant processing. In this particular embodiment, the flexibility of the pair of flexible conveyor chains 14 allows a configuration wherein the conveyor chain crop remnant extractor assembly 12 is positioned within the corn header assembly 56 itself instead of as an additional attachment as shown in FIGS. 1 and 2.

In operation, forward movement of the agricultural vehicle (not shown) pushes the corn header assembly 56 which then drags the conveyor chain crop remnant extractor assembly 12 along the ground through the pull-through cavity of the corn header 56. The remaining requirements for this operational configuration is nearly identical to the prior operational embodiment discussed above except that the pulling, pinching, and pulverizing takes place within the pull-through cavity of the corn header assembly 56.

From the above discussion and accompanying figures and claims it will be appreciated that the stem and root extractor device 10 offers many advantages over the prior art. It will be appreciated further by those skilled in the art that other various modifications could be made to the device without parting from the spirit and scope of this invention. For example, the forward movement of the agricultural vehicle and conventional corn header assembly provide the driving force for the conveyor chain crop remnant extractor assembly. It should be understood that the stem and root extractor device may include one or more drive mechanisms of any type. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:
1. A stem and root extractor device comprising:
 a crop remnant extraction assembly having, a pair of flexible conveyor chains having a first and second flexible conveyor chain, a pair of coupling conveyor arms having a first and second coupling conveyor arm, at least two pairs of rotatable wheels, a pinch cylinder, and a plurality of cross-slat bars positioned perpendicularly between the coupling conveyor arms; and wherein at least two rotatable wheels are connected to the first coupling conveyor arm and two rotatable wheels are connected to the second coupling conveyor arm.

2. The stem and root extractor device of claim 1 wherein the coupling conveyor arms have first, second, and third arm ends.

3. The stem and root extractor device of claim 1 wherein the rotatable wheels have teeth extending from an outer edge of the rotatable wheels that extend through the flexible conveyor chains such that the flexible conveyor chains are fed through the crop extraction assembly and retained against edges of the coupling conveyor arms.

4. The stem and root extractor device of claim 1 wherein the pinch cylinder has teeth extending from and around first and second edges of the pinch cylinder that extend through the flexible conveyor chains to further feed and retain the flexible conveyor chains through the assembly and against the first and second edges of the pinch cylinder.

5. The stem and root extractor device of claim 1 wherein the first and a second coupling conveyor arms are positioned in parallel relation to each other such that the first and second flexible conveyor chains are positioned and travel in parallel relation to an outer edge of the coupling conveyor arms.

6. The stem and root extractor device of claim 1 wherein the plurality of cross-slat bars extend along a width of and rotatably engage the pinch cylinder to create a pinching effect.

7. The stem and root extractor device of claim 1 wherein the plurality of cross-slat bars are not connected to the pair of coupling conveyor arms.

8. The stem and root extractor device of claim 2 wherein the plurality of cross-slat bars are positioned perpendicularly between and connected to the first and second flexible conveyor chains.

9. The stem and root extractor device of claim 3 wherein the first, second, and third ends are spaced such that the first and second coupling conveyor arms form at least two triangular shapes that are in parallel relation to and opposite each other.

10. The stem and root extractor device of claim 1 wherein one of the at least two rotatable wheels are connected to internal sides of the first and second coupling conveyor arms.

11. The stem and root extractor device of claim 3 wherein an internal side of the third end of the first coupling conveyor arm is rotatably connected to and engages a central point of a first flat end of the pinch cylinder and an internal side of the third end of the second coupling conveyor arm is rotatably connected to and engages a central point of a second flat end of the pinch cylinder.

12. The stem and root extractor device of claim 11 wherein the first flat end of the pinch cylinder is parallel and opposite the second flat end of the pinch cylinder.

13. The stem and root extractor device of claim 1 wherein the pinch cylinder is formed by a plurality of rollers.

14. The stem and root extractor device of claim 1 wherein an external side of the first end of the pair of coupling conveyor arms is connected by a two-piece pivot bracket to a back face of a corn header assembly that is positioned behind in spaced relation to a front crop feed end.

15. The stem and root extractor device of claim 14 wherein a vertical slide bracket is positioned on the back face of the corn header assembly and the pivot bracket engages the vertical slide bracket such that the crop remnant extraction assembly can be slid to a higher or lower position along the vertical slide bracket.

16. The stem and root extractor device of claim 1 wherein a stalk is pinched between the plurality of cross-slat bars and the pinch cylinder such that the stalks are retained against the pinch cylinder, pulled from the ground, and a root ball of the stalk is pulled from the ground.

17. The stem and root extractor device of claim 16 wherein the conveyor chains feed the stalk and root ball toward a rear of the crop remnant extraction assembly such that the stalks and root balls are pulverized and shed beyond a planted position of the stalk and root ball.

18. The stem and root extractor device of claim 1 wherein teeth extend from an outer and inner surface of the cross slat bars.

19. A stem and root extractor device comprising:
a crop remnant extraction assembly having a pair of flexible conveyor chains having a first and second flexible conveyor chain, a pair of coupling conveyor arms having a first and second coupling conveyor arm, at least two pairs of rotatable wheels, a pinch cylinder, and a plurality of cross-slat bars positioned perpendicularly between the coupling conveyor arms; and
wherein the pinch cylinder is formed by a plurality of rollers.

20. A stem and root extractor device comprising:
a crop remnant extraction assembly having a pair of flexible conveyor chains having a first and second flexible conveyor chain, a pair of coupling conveyor arms having a first and second coupling conveyor arm, at least two pairs of rotatable wheels, a pinch cylinder, and a plurality of cross-slat bars positioned perpendicularly between the coupling conveyor arms; and
wherein one of the at least two rotatable wheels are connected to internal sides of the first and second coupling conveyor arms.

* * * * *